United States Patent
Sullivan et al.

(10) Patent No.: US 6,995,191 B2
(45) Date of Patent: Feb. 7, 2006

(54) MULTI-LAYER GOLF BALL WITH A FOAMED INTERMEDIATE LAYER

(75) Inventors: Michael J Sullivan, Barrington, RI (US); Derek A Ladd, Acushnet, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 192 days.

(21) Appl. No.: 10/440,984

(22) Filed: May 19, 2003

(65) Prior Publication Data

US 2004/0234775 A1    Nov. 25, 2004

(51) Int. Cl.
A63B 37/00 (2006.01)
A63B 37/02 (2006.01)
A63B 37/12 (2006.01)

(52) U.S. Cl. .................. 521/134; 524/322; 524/394; 524/397; 524/398; 524/399; 524/400; 473/355; 473/373; 473/374; 473/376

(58) Field of Classification Search ........... 524/322, 524/394, 397, 398, 399, 400; 473/355, 373, 473/374, 376; 521/134
See application file for complete search history.

(56) References Cited

U.S. PATENT DOCUMENTS

| 4,085,937 A | 4/1978 | Schenk ............... 273/218 |
| 4,836,552 A | 6/1989 | Puckett et al. ........ 273/218 |
| 4,884,814 A * | 12/1989 | Sullivan ............. 473/372 |
| 5,026,067 A | 6/1991 | Gentiluomo ........... 273/220 |
| 5,482,285 A | 1/1996 | Yabuki et al. ......... 273/228 |
| 5,823,889 A | 10/1998 | Aoyama ............... 473/374 |
| 5,824,746 A | 10/1998 | Harris et al. ......... 525/196 |
| 5,833,553 A | 11/1998 | Sullivan et al. ....... 473/374 |
| 6,025,442 A | 2/2000 | Harris et al. ......... 525/221 |
| 6,057,403 A | 5/2000 | Sullivan et al. ....... 525/221 |
| 6,117,025 A * | 9/2000 | Sullivan ............. 473/373 |
| 6,126,559 A | 10/2000 | Sullivan et al. ....... 473/378 |
| 6,193,618 B1 | 2/2001 | Sullivan et al. ....... 473/373 |
| 6,309,314 B1 | 10/2001 | Sullivan et al. ....... 473/378 |
| 6,391,966 B1 * | 5/2002 | Rajagopalan .......... 525/74 |
| 6,838,501 B2 * | 1/2005 | Takesue et al. ........ 524/394 |
| 2002/0091188 A1 | 7/2002 | Statz et al. .......... 524/400 |
| 2002/0111407 A1 * | 8/2002 | Takesue et al. ........ 524/322 |

FOREIGN PATENT DOCUMENTS

| WO | WO 99/52604 | 10/1999 |
| WO | WO 00/23519 | 4/2000 |
| WO | WO 01/29129 | 4/2001 |
| WO | WO 02/079319 | 10/2002 |

OTHER PUBLICATIONS

Thain, Science and Golf IV, 2002 pp. 319-327.*

* cited by examiner

*Primary Examiner*—David J. Buttner
(74) *Attorney, Agent, or Firm*—Mandi B. Milbank

(57) ABSTRACT

A golf ball with relatively rigid inner core and soft intermediate layer is disclosed. The rigid inner core maintains the balls' high coefficient of restitution at high impact speeds, while the soft intermediate layer provides better feel for greenside play. The intermediate layer can be made from a highly neutralized polymer, which can be thermoset or thermoplastic. The highly neutralized polymer is foamed or otherwise has its specific gravity reduced. The intermediate layer can also be made from a castable reactive liquid polymer.

3 Claims, 1 Drawing Sheet

MULTI-LAYER GOLF BALL WITH A FOAMED INTERMEDIATE LAYER

FIELD OF THE INVENTION

This invention generally relates to golf balls having multiple layers with a foamed intermediate layer, such as an outer core layer or inner cover layer.

BACKGROUND

Golf balls have been designed to provide particular playing characteristics. These characteristics generally include initial ball velocity, coefficient of restitution (CoR), compression, weight distribution and spin of the golf ball, which can be optimized for various types of players.

Golf balls can generally be divided into two classes: solid and wound. Solid golf balls include single-layer, dual-layer (i.e., solid core and a cover), and multi-layer (i.e., solid core of one or more layers and/or a cover of one or more layers) golf balls. Wound golf balls typically include a solid, hollow, or fluid-filled center, surrounded by tensioned elastomeric thread, and a cover.

Generally, the hardness of a golf ball or a golf ball core is one among other factors used in designing golf balls. Typically, when a ball is hard, e.g., possessing high compression values and low deformation when struck by a club, it typically has high CoR and high initial velocity after impact with a golf club. However, hard ball has a "hard" feel and is difficult to control on the greens. A softer ball, e.g., lower compression value and high deformation, has a "soft" feel and is easier to control with short iron clubs for greenside play. Recently developed solid balls have a core, at least one intermediate layer, and a cover. The intermediate layer improves other playing characteristics of solid balls, and can be made from thermoset or thermoplastic materials.

Recent advancements in golf ball design can produce golf balls with low compression for soft "feel" and high CoR for long flight distance. The CoR for low compression balls, however, decreases at higher impact speed with golf clubs.

Hence, there remains a need in the art for a relatively soft golf balls that have high coefficient of restitution at low impact speeds and at high impact speeds.

SUMMARY OF THE INVENTION

Hence, the present invention is directed to a golf ball that has high coefficient of restitution at all impact speeds.

The present invention is directed to a golf ball comprising a core, an intermediate layer and a cover layer. The intermediate layer comprises a highly neutralized polymer, which has its specific gravity reduced to less than 1.05, and the core has a compression in the range of between about 40 PGA and about 120 PGA. The compression of the core is higher than the compression of the core and the encasing intermediate layer.

Suitable highly neutralized polymers include (a) an ethylene, $C_{3-8}$ alpha, beta-ethylenically unsaturated carboxylic acid copolymer, (b) a high molecular weight, monomeric organic acid or salt thereof and (c) a cation source. This polymer may further include (d) a thermoplastic elastomer polymer selected from copolyetheresters, copolyetheramides, block styrene polydiene thermoplastic elastomers, elastomeric polyolefins, and thermoplastic polyurethanes.

Suitable highly neutralized polymers further include a melt processible thermoplastic composition comprising (a) aliphatic, mono-functional organic acid(s) having fewer than 36 atoms and (b) an ethylene, $C_{3-8}$ alpha, beta-ethylenically unsaturated carboxylic acid copolymer(s) and ionomer(s) thereof. Other suitable highly neutralized polymers include (a) a salt of a high molecular weight organic acid, (b) an acid containing copolymer ionomer, and an optional (c) a thermoplastic polymer selected from co-polyesteresters, copolyetheramides, block styrene polydiene thermoplastic elastomers, elastomeric polyolefins, and thermoplastic polyurethanes.

Additional highly neutralized polymers include an acid group neutralized by an organic acid or a salt thereof, and the organic acid or salt thereof is present in an amount sufficient to neutralize the polymer by at least about 80%. This highly neutralized polymer can be is blended with a polymer selected from a group consisting of ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. The organic acid includes aliphatic organic acids, aromatic organic acids, saturated mono-functional organic acids, unsaturated mono-functional organic acids, and multi-unsaturated mono-functional organic acids. The salt of organic acids is selected from a group consisting of the salts of barium, lithium, sodium, zinc, bismuth, chromium, cobalt, copper, potassium, strontium, titanium, tungsten, magnesium, cesium, iron, nickel, silver, aluminum, tin, calcium, stearic, bebenic, erucic, oleic, linoelic, or dimerized derivatives, and mixtures thereof.

Suitable highly neutralized polymers further include ethylene/carboxylic acid/alkyl (meth)acrylate copolymers and terpolymers, and a foamed composition formed from a saponified polymer blended with a metallocene catalyzed polymer.

The specific gravity of the highly neutralized polymer is reduced by the incorporating low specific gravity fillers into the polymer or by foaming. The specific gravity of the highly neutralized polymer is from about 0.2 to about 0.99, more preferably from about 0.3 to about 0.95, and most preferably from about 0.4 to about 0.90. The highly neutralized polymer has a durometer hardness from about 5 to about 80 Shore D before having its specific gravity reduced, more preferably about 20 to about 65 Shore D, and most preferably about 30 to about 55 Shore D.

The compression of the core is between about 60 and about 110 PGA, and the durometer hardness of the core is greater than about 40 Shore D and more preferably greater than about 60 Shore D. The specific gravity of the core is between about 0.9 to about 2.0 and more preferably between about 1.0 to about 1.5. The specific gravity of the core is greater than the specific gravity of the intermediate layer. The compression of the core and the intermediate layer is between about 20 PGA and about 110 PGA, more preferably between about 40 PGA and about 100 PGA, and most preferably between about 50 PGA and about 90 PGA. The core can have two or more layers.

The overall diameter of the core and the intermediate layer is from about 1.50 inches to about 1.66 inches and preferably from about 1.55 inches to about 1.64 inches. The thickness of the intermediate layer is from about 0.001 inch to about 0.250 inch, more preferably from about 0.010 inch to about 0.100 inch, and most preferably from about 0.020 inch to about 0.050 inch.

The cover comprises a polymer, which can be polyurethane, ionomer, polyurea, partially or fully neutralized ionomer, metallocene catalyzed polymers, polyesters, polyamides, thermoplastic elastomers, copolyether esters and copolyether-amides. The cover has a hardness in the range of less than 65 Shore D.

The coefficient of restitution of this ball is at least 0.800 at 125 feet per second, more preferably at least 0.805 at 125 feet per second, and most preferably at least 0.810 at 125 feet per second. The coefficient of restitution is at least 0.790 at 140 feet per second, and the coefficient of restitution is at least 0.760 at 160 feet per second.

compression cores. As illustrated herein, a first golf ball with a 1.505 inch core and a core compression of 48 (hereinafter "Sample-48") and a second golf ball with a 1.515 inch core and a core compression of 80 (hereinafter "Sample-80") were subject to the following distance and CoR tests. Sample-48 and Sample-80 have essentially the same size core and similar dual-layer cover. The single most significant difference between these two balls is the compression of the respective cores.

|  | Compression On Ball | Ball Speed (feet per second) | | | |
| --- | --- | --- | --- | --- | --- |
|  |  | Average Driver Set-up | Standard Driver Set-up | Pro 167 Driver Set-up | Big Pro 175 Driver Set-up |
| Sample-48 | 86 | 141.7 | 162.3 | 167.0 | 175.2 |
| Sample-80 | 103 | 141.5 | 162.1 | 168.9 | 176.5 |

|  | Compression On Ball | Coefficient of Restitution (CoR) | | | |
| --- | --- | --- | --- | --- | --- |
|  |  | Mass Plate (125 ft/s) | Mass Plate (160 ft/s) | 200-gram Solid Plate (160 ft/s) | 199.8-gram Calibration Plate (160 ft/s) |
| Sample-48 | 86 | 0.812 | 0.764 | 0.759 | 0.818 |
| Sample-80 | 103 | 0.796 | 0.759 | 0.753 | 0.836 |
| Difference (Sample-48–Sample-80) |  | +0.016 | +0.005 | +0.006 | −0.018 |

The present invention is also directed to a golf ball comprising a core, an intermediate layer and a cover layer. The intermediate layer comprises a castable reactive liquid polymer, and the castable reactive liquid polymer has its specific gravity reduced to less than 1.05. The core has a compression in the range of between about 40 PGA and about 120 PGA, and the compression of the core is higher than the compression of the core and the encasing intermediate layer. Castable reactive liquid polymer includes thermoset urethanes and polyurethanes, polyureas, polyesters, thermoset urethane ionomers and thermoset urethane epoxies, and blends thereof.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
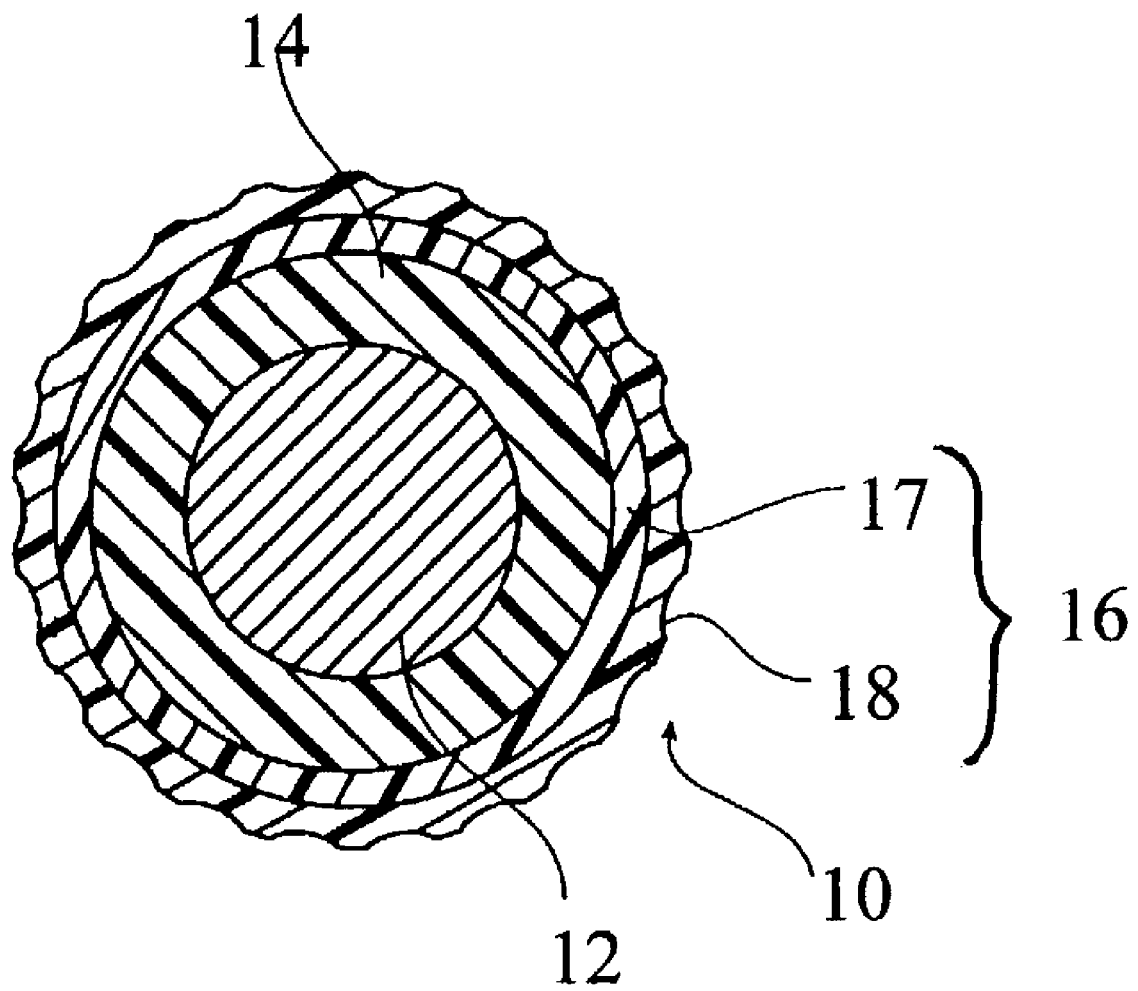
FIG. 1 is a cross-sectional view of an embodiment of the present invention.

As disclosed in commonly owned co-pending patent application entitled "Low Deformation Golf Ball," bearing Ser. No. 10/279,506 filed on Oct. 24, 2002, golf balls made with soft cores exhibit high coefficient of restitution (CoR) at relatively low club speeds. The CoR of these balls is higher than the CoR of similar balls with higher compression cores at relatively low club speeds. At higher club speeds, however, the CoR of golf balls with low compression cores can be lower than the CoR of balls with higher Initial velocity of a golf ball after impact with a golf club is governed by the United States Golf Association ("USGA"). The USGA requires that a regulation golf ball can have an initial velocity of no more than 250 feet per second ±2% or 255 feet per second under certain conditions. The USGA initial velocity limit is related to the ultimate distance that a ball may travel (280 yards±6%), and is also related to the CoR. CoR is the ratio of the relative velocity between two objects after direct impact to the relative velocity before impact. As a result, the CoR can vary from 0 to 1, with 1 being equivalent to a perfectly or completely elastic collision and 0 being equivalent to a perfectly plastic or completely inelastic collision. Since a ball's CoR directly influences the ball's initial velocity after club collision and travel distance, golf ball manufacturers are interested in this characteristic for designing and testing golf balls.

As used in the ball speed test, the "average driver set-up" refers to a set of launch conditions, i.e., at a club head speed to which a mechanical golf club has been adjusted so as to generate a ball speed of about 140 feet per second. Similarly, the "standard driver set-up" refers to similar ball speed at launch conditions of about 160 feet per second; the "Pro 167 set-up" refers to a ball speed at launch conditions of about 167 feet per second; and the "Big Pro 175 set-up" refers to a ball speed at launch conditions of about 175 feet per second. Also, as used in the CoR test, the mass plate is a 45-kilogram plate (100 lbs) against which the balls strike at the indicated speed. The 200-gram solid plate is a smaller mass that the balls strike and resembles the mass of a club head. The 199.8-gram calibration plate resembles a driver with a flexible face that has a CoR of 0.830. The methods for measuring CoR are described below.

The ball speed test results show that while Sample-48 holds a ball speed advantage at club speeds of 140 feet per second to 160 feet per second launch conditions, Sample-80 decidedly has better ball speed at 167 feet per second and 175 feet per second launch conditions.

Similarly, the CoR test results show that at the higher collision speed (160 feet per second), the CoR generally goes down for both balls, but the 199.8-gram calibration test shows that the CoR of the higher compression Sample-80 is significantly better than the lower compression Sample-48 at the collision speed (160 feet per second). Additionally, while the CoR generally goes down for both balls, the rate of decrease is much less for Sample-80 than for Sample-48. Unless specifically noted, CoR values used hereafter are measured by either the mass plate method or the 200-gram solid plate method, i.e., where the impact plate is not flexible.

Without being limited to any particular theory, the inventors of the present invention believe that at high impact, the ball with lower core compression deforms more than the ball with higher core compression. Such deformation negatively affects the initial velocity and CoR of the ball.

One conventional technique for measuring CoR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $CoR = T_{out}/T_{in}$.

Another CoR measuring method uses a titanium disk. The titanium disk intending to simulate a golf club is circular, and has a diameter of about 4 inches, and has a mass of about 200 grams. The impact face of the titanium disk may also be flexible and has its own coefficient of restitution, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen so that the time period to transit between the light screens is measured. This provides an incoming transit time period proportional to the ball's incoming velocity. The ball impacts the titanium disk, and rebounds through the light screens, which measure the time period to transit between the light screens. This provides an outgoing transit time period proportional to the ball's outgoing velocity. CoR can be calculated from the ratio of the outgoing time period to the incoming time period along with the mass of the disk and ball:

$$CoR = \frac{(T_{out}/T_{in}) \times (M_e + M_b) + M_b}{M_e}$$

In accordance to the present invention, a golf ball is provided with a foamed intermediate layer, which encases a low deformation, relatively rigid inner core. In accordance to a preferred embodiment of the present invention, golf ball 10 comprises at least innermost core 12, intermediate layer 14, which can be an outer core or an inner cover, and cover 16. Preferably, intermediate layer 14 comprises a soft or low hardness polymeric composition and inner core 12 comprises one or more of the low deformation, relatively rigid materials, discussed below. The low deformation, relatively rigid inner core 12 resists deformation at high club speeds to maintain the CoR at an optimal level, while outer layer 14 provides the requisite softness for high iron club play. Preferably, the inner core has high specific gravity and the outer core has low specific gravity to provide the ball with low rotational moment of inertia for high spin. The inventive ball 10, therefore, enjoys high initial velocity and high CoR at high club head speeds, while maintaining a desirable soft feel and high spin for greenside play. Alternatively, the inner core may have low specific gravity and one or more cover layers may be filled with high specific gravity fillers, such as tungsten, to create a low spin ball for players who desire a long distance ball. Filled cover layers are fully disclosed in commonly owned co-pending patent application entitled "Golf ball with Foam Core and Filled Cover," bearing Ser. No. 10/282,713 and filed on Oct. 29, 2002.

The preferred polymeric core composition for rigid inner core 12 comprises a base rubber compound, a co-reaction agent, a filler, and a co-crosslinking or initiator agent. The base rubber compound typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 40. Preferably, the polybutadiene rubber has a molecular weight greater than about 400,000 and a polydispersity of no greater than about 2. Such base rubber compounds are commercially available from Bayer of Akron, Ohio, UBE Industries of Tokyo, Japan, and Shell of Houston, Tex., among others. The base rubber may also be mixed with other elastomers known in the art such as natural rubber, polyisoprene rubber and/or styrene-butadiene rubber in order to modify the properties of the core.

"Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

A common indicator of the degree of molecular weight distribution of a polymer is its polydispersity, defined as the ratio of weight average molecular weight, $M_w$, to number average molecular weight, $M_n$. Polydispersity ("dispersity") also provides an indication of the extent to which the polymer chains share the same degree of polymerization. If the polydispersity is 1.0, then all polymer chains must have the same degree of polymerization. Since $M_w$ is always equal to or greater than $M_n$, polydispersity, by definition, is equal to or greater than 1.0.

Preferably, when the low deformation inner core is made with polybutadiene or other synthetic and natural rubber, the rubber composition is highly cross-linked with at least 50 phr of a suitable co-reaction agent, which includes a metal salt of diacrylate, dimethacrylate or mono methacrylate.

Preferably, the co-reaction agent is zinc diacrylate. Highly cross-linked rubber compounds are discussed in commonly owned co-pending patent application entitled "Golf Ball and Method for Controlling the Spin Rate of Same" bearing Ser. No. 10/178,580 filed on Jul. 20, 2002. This discussion is incorporated herein by reference.

Suitable cross-linking agents include any known polymerization initiator, which decomposes during the cure cycle. Such initiators include, but are not limited to, organic peroxide compounds such as dicumyl peroxide. In its pure form, the preferred amount of peroxide is between about 0.25 phr and about 2.5 phr. Any filler can be used in any desired quantity to alter a property of the core, including specific weight, flexural modulus, moment of inertia, and rheological properties, among others. Suitable fillers include, but are not limited to, tungsten, zinc oxide, barium sulfate, silica, metal oxides, ceramic and fibers.

The preferred polybutadiene rubber composition may further include an $\alpha,\beta$-unsaturated carboxylic acid or a metal salt thereof, an organic peroxide, and a filler.

The low deformation layer in accordance to the present invention may further comprise a durable, low deformation material such as metal, rigid plastics, or polymers re-enforced with high strength organic or inorganic fillers or fibers, or blends or composites thereof, as discussed below. Suitable plastics or polymers include, but not limited to, high cis- or trans-polybutadiene, one or more of partially or fully neutralized ionomers including those neutralized by a metal ion source wherein the metal ion is the salt of an organic acid, polyolefins including polyethylene, polypropylene, polybutylene and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates). Suitable polymers also include metallocene catalyzed polyolefins, polyesters, polyamides, non-ionomeric thermoplastic elastomers, copolyether-esters, copolyether-amides, EPR, EPDM, thermoplastic or thermosetting polyurethanes, polyureas, polyurethane ionomers, epoxies, polycarbonates, polybutadiene, polyisoprene, and blends thereof In the case of metallocenes, the polymer may be cross-linked with a free radical source, such as peroxide, or by high radiation. Suitable polymeric materials also include those listed in U.S. Pat. Nos. 6,187,864, 6,232,400, 6,245,862, 6,290,611, 6,142,887, 5,902,855 and 5,306,760 and in PCT publication nos. WO 01/29129 and WO 00/23519.

Another readily apparent advantage of the present invention is that highly rigid materials, such as certain metals, can now be used in a golf ball, because the rigidity of the materials can resist the deformation of the low compression, high CoR layer. Suitable rigid metals include, but not limited to, tungsten, steel, titanium, chromium, nickel, copper, aluminum, zinc, magnesium, lead, tin, iron, molybdenum and alloys thereof.

Suitable highly rigid materials include those listed in columns 11, 12 and 17 of U.S. Pat. No. 6,244,977. Fillers with very high specific gravity such as those disclosed in U.S. Pat. No. 6,287,217 at columns 31–32 can also be incorporated into the inner core 15. Suitable fillers and composites include, but not limited to, carbon including graphite, glass, aramid, polyester, polyethylene, polypropylene, silicon carbide, boron carbide, natural or synthetic silk.

As stated above, at least a portion of intermediate layer 14, which can be an outer core or an inner cover layer, may comprise a density reducing filler, hollow mircrospheres, or otherwise may have its specific gravity reduced, e.g., by foaming the polymer. The effective specific gravity for this low specific gravity layer is preferably less than 1.05 and more preferably less than 1.0. The low specific gravity layer can be made from a number of suitable materials, so long as the low specific gravity layer is durable, and does not impart undesirable characteristics to the golf ball. Preferably, the low specific gravity layer contributes to the soft compression and resilience of the golf ball.

The low specific gravity layer is preferably made from a highly neutralized polymer that has its specific gravity reduced by any methods, such as incorporating cellular resins, low specific gravity filler, hollow fillers or microspheres in the polymeric matrix, where the cured composition has the preferred specific gravity. The highly neutralized polymer can be a thermoplastic or a thermoset polymer. Alternatively, the polymeric matrix can be foamed to decrease its specific gravity. Preferably, foaming is accomplished by blowing agents, such as nitrogen-based azo compounds. Suitable azo compounds include, but are not limited to, 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide. These blowing agents are commercially available from Crompton Uniroyal Chemical in the United States and the United Kingdom, and from Hepce Chemical in Korea, among others. Any agent that releases gas at certain temperatures and pressures can be used to foam the core material.

A suitable highly neutralized polymer for intermediate layer 14 is a polymer or copolymer that has at least 80% and preferably 100% of the acid contained therein neutralized. Such highly neutralized polymers or copolymers are disclosed in U.S. patent application publication no. 2002/0091188, PCT international publication nos. WO 01/29129 and WO 00/23519. The disclosures of these three references are incorporated by reference in their entireties.

More specifically, suitable highly neutralized polymers include, but are not limited to, composition comprising (a) an ethylene, $C_{3-8}$ alpha, beta-ethylenically unsaturated carboxylic acid copolymer, (b) a high molecular weight, monomeric organic acid or salt thereof, and (c) a cation source. Preferably, (c) is present at a level sufficient to neutralize the combined acid content of (a) and (b). This highly neutralized polymer can also be blended with (d) a thermoplastic elastomer polymer selected from copolyetheresters, copolyetheramides, block styrene polydiene thermoplastic elastomers, elastomeric polyolefins, and thermoplastic polyurethanes. In this example, component (b) is present at about 10 to about 45 weight percent (wt. %) of (a), (b) and (d) provided that component (b) does not exceed 50 wt. % of (a) plus (b); and component (d) is present at about 1 to about 35 wt. % of (a), (b) and (d).

Another suitable highly neutralized composition includes (a) a salt of a high molecular weight organic acid and (b) an acid containing copolymer ionomer. This highly neutralized polymer may be blended with (c) a thermoplastic polymer selected from co-polyesteresters, copolyetheramides, block styrene polydiene thermoplastic elastomers, elastomeric polyolefins, and thermoplastic polyurethanes.

Suitable highly neutralized polymers also include a melt processible thermoplastic composition of a highly neutralized ethylene acid copolymer. This composition preferably comprises (a) aliphatic, mono-functional organic acid(s)

having fewer than 36 atoms and (b) an ethylene, $C_{3-8}$ alpha, beta-ethylenically unsaturated carboxylic acid copolymer(s) and ionomer(s) thereof. More preferably, this composition is a melt-processible highly neutralized polymer of ethylene, $C_{3-8}$ alpha, beta-ethylenically unsaturated carboxylic acid copolymers that have their crystallinity disrupted by addition of a softening monomer or other means, such as high acid levels, and a non-volatile, non-migratory agents such as organic acids or salts selected for their ability to substantially or totally suppress any remaining ethylene crystallinity.

Other suitable highly neutralized polymers include those disclosed in commonly owned co-pending patent application entitled "Golf Balls Comprising Highly-Neutralized Acid Polymers" bearing Ser. No. 10/118,719 filed on Apr. 9, 2002. The disclosure of this application is hereby incorporated by referenced in its entirety. This highly neutralized polymer contains an acid group neutralized by an organic acid or a salt thereof, the organic acid or salt thereof being present in an amount sufficient to neutralize the polymer by at least about 80%. This polymer may be blended with ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof. The organic acid may be selected from the group consisting of aliphatic organic acids, aromatic organic acids, saturated mono-functional organic acids, unsaturated mono-functional organic acids, and multi-unsaturated mono-functional organic acids. Preferably, the salt of organic acids comprise the salts of barium, lithium, sodium, zinc, bismuth, chromium, cobalt, copper, potassium, strontium, titanium, tungsten, magnesium, cesium, iron, nickel, silver, aluminum, tin, calcium, stearic, bebenic, erucic, oleic, linoelic, dimerized derivatives, and mixtures thereof.

In this example, the intermediate layer may further comprise a second polymer component in an amount sufficient to reduce compression. It is also preferred that the second polymer component comprises ionomeric copolymers and terpolymers, ionomer precursors, thermoplastics, thermoplastic elastomers, thermoset elastomers, grafted metallocene-catalyzed polymers, non-grafted metallocene-catalyzed polymers, single-site polymers, high-crystalline acid polymers, cationic ionomers, and mixtures thereof. At least one of the polymer or second polymer component is partially neutralized by a metal cation.

Suitable highly neutralized polymers further include those disclosed in PCT International Publication no. WO 02/079319. This reference discloses highly neutralized ethylene/carboxylic acid/alkyl (meth)acrylate copolymers and terpolymers that exhibit low flexural modulus, as measured in accordance to ASTM D6272-98 about two weeks after the test specimen are prepared, and high melt index, as measured in accordance to the ASTM D 1238 standard. These polymers can also be used in the cover.

These preferred highly neutralized polymeric compositions have their specific gravity reduced by the methods described above so that intermediate layer 14 has the preferred specific gravity of less than 1.05, in accordance to the present invention.

Highly neutralized polymers can be blended with other known golf ball materials, such as ionomers, polyamides, polyurethanes, and polyureas, among those listed as being capable of blending with highly neutralized polymers in commonly owned, co-pending patent application entitled "Golf Ball Comprising Highly Neutralized Acid Polymers," bearing Ser. No. 10/118,719 and filed on Apr. 9, 2002, which has already been incorporated herein by reference. Alternatively, intermediate layer 14 may comprise a foamed composition formed from a saponified polymer blended with a metallocene catalyzed polymer. Such composition is fully disclosed in commonly owned PCT International Publication no. WO 99/52604, which is hereby incorporated by reference in its entirety.

Suitable rubber compounds for intermediate layer 14 also include any suitable thermoset material, which is formed from a castable reactive liquid material. The preferred materials include, but are not limited to, thermoset urethanes and polyurethanes, polyureas, polyesters, thermoset urethane ionomers and thermoset urethane epoxies, and blends thereof. Examples of suitable polyurethane ionomers are disclosed in U.S. Pat. No. 5,692,974 entitled "Golf Ball Covers," the disclosure of which is hereby incorporated by reference in its entirety in the present application.

Intermediate layer 14 may comprise a plurality of layers, e.g., a laminate, where several thin layers are plied or otherwise adhered together.

Preferably, rigid inner core 12 has durometer hardness in the range of greater than about 40 on the Shore D scale, and more preferably greater than 60 Shore D. Preferably, the intermediate layer is made form a polymer that has an un-foamed durometer hardness between about 5 to about 80 on the Shore D scale, more preferably between about 20 to about 65 Shore D, and most preferably between about 30 to about 55 Shore D. The compression of the rigid inner core is preferably in the range of about 40 to 120 PGA or Atti. More preferably, the compression is in the range of about 60 to about 110 PGA or Atti. Preferably, the compression of inner core 12 is greater than the compression of the subassembly of inner core 12 encased by intermediate layer 14.

Shore hardness is measured according to ASTM D-2240-00. Compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160-Riehle Compression).

Thus, a Riehle compression of 100 would be the same as an Atti compression of 60.

Preferably, the specific gravity of inner core 12 is greater than the specific gravity of intermediate layer 14. The specific gravity of inner core 12 is between about 0.9 and about 2.0, and preferably between about 1.0 and 1.5. The specific gravity of intermediate layer 14 is between about 0.2 and 0.99, more preferably between 0.30 and bout 0.95, and most preferably between about 0.4 and 0.90.

The cover 16 should be tough, cut-resistant, and selected from conventional materials used as golf ball covers based on the desired performance characteristics. The cover may be comprised of one or more layers. Cover materials such as ionomer resins, blends of ionomer resins, thermoplastic or thermoset urethane, and balata, can be used as known in the art.

The cover 16 is preferably a resilient, non-reduced specific gravity layer. Suitable materials include any material that allows for tailoring of ball compression, coefficient of restitution, spin rate, etc. and are disclosed in U.S. Pat. Nos. 6,419,535, 6,152,834, 5,919,100 and 5,885,172. ionomers, ionomer blends, thermosetting or thermoplastic polyurethanes, metallocenes are the preferred materials. The cover can be manufactured by a casting method, reaction injection molded, injected or compression molded, sprayed or dipped method.

In a preferred embodiment, cover 16 comprises an inner cover 17 and an outer cover 18. As disclosed in the U.S. Pat. Nos. 5,885,172 and 6,132,324, which are incorporated herein by reference in their entireties, outer cover layer 18 is made from a soft thermoset material, such as cast polyurethane, and inner cover 17 is made from a rigid material to provide ball 10 with progressive performance, i.e., the ball has the low spin and long distance benefits of a hard cover ball when struck with a driver club and high spin and soft feel characteristics of a traditional soft cover ball when struck with short irons.

Inner cover layer 17 is formed preferably from a hard, high flexural modulus, resilient material that contributes to the low spin, distance characteristics of the presently claimed balls when they are struck for long shots (e.g. driver or long irons). Specifically, the inner cover layer materials have a Shore D hardness of about 65–80, preferably about 69–74 and most preferably about 70–72. The flexural modulus of inner cover layer 17 is at least about 65,000 psi, preferably about 70,000 psi to about 120,000 psi and most preferably at least about 75,000 psi. The thickness of the inner cover layer can range from about 0.020 inches to about 0.045 inches, preferably about 0.030 inches to about 0.040 inches and most preferably about 0.035 inches.

Outer cover layer 18 is formed preferably from a relatively soft thermoset material in order to replicate the soft feel and high spin play characteristics of a balata ball for "short game" shots. In particular, the outer cover layer should have Shore D hardness of less than 65 or from about 30 to about 60, preferably 35–50 and most preferably 40–45. Additionally, the materials of the outer cover layer must have a degree of abrasion resistance in order to be suitable for use as a golf ball cover. The outer cover layer of the present invention can comprise any suitable thermoset material, which is formed from a castable reactive liquid material. The preferred materials for the outer cover layer include, but are not limited to, thermoset urethanes and polyurethanes, thermoset urethane ionomers and thermoset urethane epoxies. Examples of suitable polyurethane ionomers are disclosed in U.S. Pat. No. 5,692,974 entitled "Golf Ball Covers," the disclosure of which is hereby incorporated by reference in its entirety in the present application. Thermoset polyurethanes and polyureas are preferred for the outer cover layers of the balls of the present invention.

The diameter of ball 10 is preferably in the range of about 1.60 inches to about 1.80 inches, and more preferably in the range of about 1.68 inches to about 1.69 inches. Preferably, intermediate layer 14, as an outer core layer, has a thickness from about 0.001 inch to about 0.250 inch, preferably from bout 0.010 inch to about 0.100 inch and more preferably from about 0.020 inch to about 0.050 inch. Preferably, the overall diameter of the inner core and the intermediate layer is in the range of about 1.50 inches to about 1.66 inches, preferably in the range of about 1.55 inches to about 1.64 inches. The inner core 12 may have any dimension so long as the overall diameter has the preferred dimensions listed above. Preferably, inner core 12 has a diameter in the range of about 1.00 inches to about 1.65 inches, more preferably from about 1.40 inches to about 1.62 inches and most preferably from about 1.5 inches to about 1.60 inches. Ball 10 preferably weighs 1.60 oz or more, and more preferably about 1.62 oz.

Golf ball 10 in accordance to the first embodiment achieves the objects of this invention, because the rigid, high specific gravity inner core 12 provides the ball with low deformation at high club head speeds to maintain the CoR in the preferred high range at high club head speeds, while the low compression, low specific gravity outer core 14 provides good feel at lower club head speeds and high spin for controlled greenside play.

Golf ball 10 made in accordance with the present invention and disclosed above has a compression in the range of about 20 PGA to about 110 PGA, preferably in the range of about 40 PGA to about 100 PGA, and more preferably in the range of about 50 PGA to about 90 PGA. The inventive balls exhibit CoR of at least 0.80 at 125 feet per second, preferably at least 0.805 at 125 feet per second and more preferably at least 0.81 at 125 feet per second. The balls also preferably exhibit CoR of at least 0.790 at 140 feet per second. These balls also preferably exhibit CoR of at least 0.76 at 160 feet per second.

While it is apparent that the illustrative embodiments of the invention disclosed herein fulfill the objectives stated above, it is appreciated that numerous modifications and other embodiments may be devised by those skilled in the art. One such modification is that the outer surface can be flush with the inner surface free ends or it can extend beyond the free ends. Therefore, it will be understood that the appended claims are intended to cover all such modifications and embodiments, which would come within the spirit and scope of the present invention.

We claim:

1. A golf ball comprising a core, an intermediate layer and a cover layer, wherein the intermediate layer comprises a highly neutralized thermoplastic polymer which has its specific gravity reduced to less than 1.05, is neutralized by at least about 80%, and comprises a foamed composition formed from a saponified polymer blended with a metallocene catalyzed polymer, and wherein the core has a compression in the range of between about 40 PGA and about 120 PGA, and wherein the compression of the core is higher than the compression of the core and the encasing intermediate layer.

2. A golf ball comprising a core, an intermediate layer and a cover layer, wherein the intermediate layer comprises a highly neutralized thermoplastic polymer, wherein the highly neutralized thermoplastic polymer has its specific gravity reduced to less than 1.05, and wherein the core has a compression in the range of between about 40 PGA and about 120 PGA and the compression of the core is higher than the compression of the core and the encasing intermediate layer, wherein the highly neutralized polymer comprises a foamed composition formed from a saponified polymer.

3. A golf ball comprising a core, an intermediate layer and a cover layer, wherein the intermediate layer comprises a highly neutralized thermoplastic polymer which has its specific gravity reduced to less than 1.05 and comprises a foamed composition formed from a saponified polymer blended with a metallocene catalyzed polymer, and wherein the core has a compression in the range of between about 40 PGA and about 120 PGA, and wherein the compression of the core is higher than the compression of the core and the encasing intermediate layer.

* * * * *